United States Patent [19]

Fujiwara

[11] Patent Number: 5,149,985
[45] Date of Patent: Sep. 22, 1992

[54] TWO-BATTERY SUPPLY FOR OPERATING AND WAITING MODES OF A CARPHONE

[75] Inventor: Ryuhei Fujiwara, Tokyo, Japan
[73] Assignee: NEC Corporation
[21] Appl. No.: 606,986
[22] Filed: Oct. 31, 1990
[30] Foreign Application Priority Data
Oct. 31, 1989 [JP] Japan .................. 1-283557
[51] Int. Cl.[5] ............................ H02J 9/06
[52] U.S. Cl. .................. 307/10.7; 307/10.1; 307/48; 307/70; 307/86; 455/345
[58] Field of Search ............. 307/9.1, 10.1, 10.7, 307/23, 29, 43, 44, 48, 66, 70, 72, 74, 80, 81, 85, 86, 52, 53, 58; 455/343, 345, 346; 364/492–494

[56] References Cited

U.S. PATENT DOCUMENTS

| | | |
|---|---|---|
| 4,069,675 | 1/1978 | Adler et al. .................. 60/667 |
| 5,033,109 | 7/1991 | Kawano et al. .................. 455/90 |
| 5,060,300 | 10/1991 | Luber et al. .................. 455/343 |

Primary Examiner—A. D. Pellinen
Assistant Examiner—David Osborn

[57] ABSTRACT

An apparatus for controlling a power supply of an electric machine in a vehicle comprises primary and secondary power supplies for supplying an electric power to the electric machine. In an engine-off state the primary power supply is selected as a power supply for the electric machine when an electric power consumption of the electric machine is over a predetermined value, indicating an operating mode, and the secondary power supply is selected when the consumption is below the predetermined value, indicating a waiting mode. Therefore, the absentee receiving of facsimile information, the absentee recording of telephone message, etc. are carried out, even in an ignition-off state. The secondary power supply is used mainly in the case that the electric machine is in waiting mode, so that the complete exhaustion of the secondary battery can be prevented.

12 Claims, 4 Drawing Sheets

TWO-BATTERY SUPPLY FOR OPERATING AND WAITING MODES OF A CARPHONE

FIELD OF THE INVENTION

This invention relates to an apparatus for controlling a power supply of an electric machine in a vehicle, and more particularly to, an apparatus for controlling the change-over between a primary power supply and a secondary power supply for an electric machine such as a telephone set, a facsimile machine, etc. in a vehicle.

BACKGROUND OF THE INVENTION

A conventional power supply of an electric machine such as a mobile (portable) telephone set in a car is connected through an ignition (key) switch to a car battery, so that an electric power is supplied to the telephone set, when the ignition switch is turned on. Therefore, the supply of an electric power is shut off to avoid unintentional consumption thereof, when the ignition switch is turned off. This structure is adopted, for the reason that electric power is consumed in the telephone set during not only in an occupied state for communication, but also in a waiting state for receiving a call. Consequently, the exhaustiveness of the car battery is avoided by turning the ignition switch off.

However, the conventional power supply of an electric machine in a car has a disadvantage in that an absentee (caretaking) recording of telephone message, an absentee receiving of facsimile information, etc. are not carried out, when an ignition key is pulled out and a driver leaves the car, so that the ignition switch is turned off to shut off the supply of an electric power to the telephone set.

SUMMARY OF THE INVENTION

Accordingly, it is an object of the invention to provide an apparatus for controlling a power supply of an electric machine in a vehicle, by which an absentee recording of telephone message, an absentee receiving of facsimile information, etc. are carried out, even in a state of turning-off of an ignition switch.

According to this invention, an apparatus for controlling a power supply of an electric machine in a vehicle, comprises:

a primary power supply for supplying an electric power to the electric machine, the primary power supply being a battery which is charged from a generator driven by an engine of the vehicle;

a secondary power supply for supplying an electric power to the electric machine, the secondary power supply being an additional battery which is charged from the primary power supply;

means for detecting a load current of the electric machine;

means for selecting one power supply from the primary and secondary power supplies; and means for controlling the selecting means to select the primary power supply, when the load current is over a predetermined value, and to select the secondary power supply, when the load current is below the predetermined value.

BRIEF DESCRIPTION OF THE DRAWINGS

The invention will be explained in more detail in conjunction with appended drawings, wherein.

DESCRIPTION OF PREFERRED EMBODIMENTS

Before describing an apparatus for controlling a power supply of an electric machine in a vehicle, a conventional power supply system of an electric machine in a vehicle briefly described before will be explained in conjunction with FIG. 1.

Figure 1:
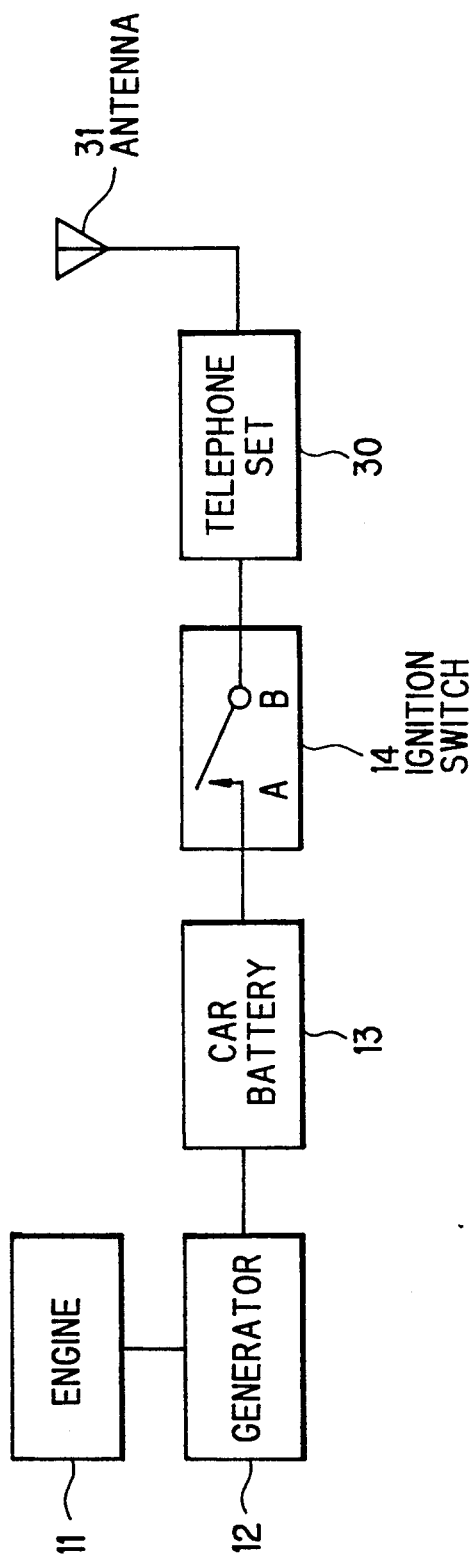
FIG. 1 is a block diagram showing a conventional power supply system of an electric machine in a car.

FIG. 1 shows the conventional power supply system of an electric machine in a car, in which a telephone set 30 as an electric machine with an antenna 31 is connected through an ignition switch 14 having terminals A and B to a car battery 13 to be charged by a generator 12 which is driven by an engine 11 of the car. An electric power is supplied to the telephone set 30 from the car battery 13, when the ignition switch 14 is turned on. On the other hand, the supply of an electric power is shut off to avoid unintentional consumption thereof, when the ignition switch 14 is turned off. In this structure, however, an absentee recording of telephone message cannot be carried out, when the ignition switch 14 is turned off and a driver leaves the car.

U.S. Ser. No. 07/55085 filed on Jul. 10, 1990 assigned to the same assignee discloses an improved apparatus for controlling a power supply of an electric machine in a vehicle, in which a secondary battery is added to supply an electric power to the electric machine, when an ignition switch is turned off. The present invention further improves the copending application in that the exhaustive power consumption of the secondary battery which is caused by long-period or repetitive power supply is avoided.

Figure 2:
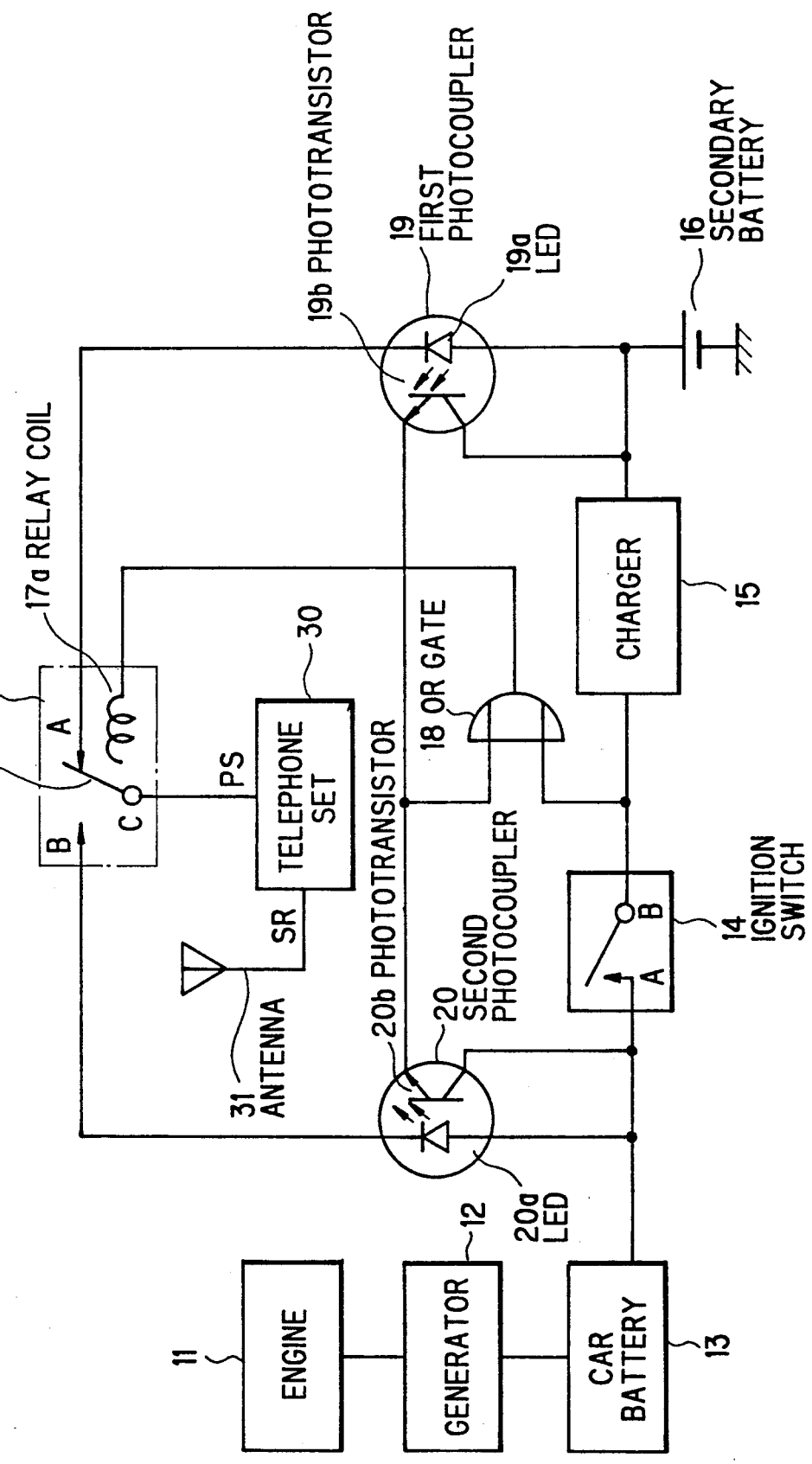
FIGS. 2 to 4 are block diagrams showing an apparatus for controlling a power supply of an electric machine in a car in first to third preferred embodiment according to the invention.

FIG. 2 shows an apparatus for controlling a power supply of an electric machine in a car in the first preferred embodiment.

A car battery 13, as a primary power supply for supplying an electric power to electric machines in a car including a telephone set 30, is connected to and charged from a generator 12 which is driven by an engine 11 of the car. An ignition switch 14 is connected at one terminal A to be car battery 13 and at the other terminal B to a charger 15. A secondary battery 16, as a secondary power supply for supplying an electric power to the telephone set 30, is connected at a positive terminal to the charger 15 by which the secondary battery 16 is charged, and at a negative terminal to ground. A relay 17 includes a relay coil 17a which is connected at one terminal to an output of an OR gate 18, and a relay contact 17b, which is connectable via a first fixed contact point A to a first photocoupler 19 and via a second fixed contact point B to a second photocoupler 20, having a movable contact point C connected to a power supply terminal PS of the telephone set 30. The OR gate 18 has two inputs, one of which from the first and second photocouplers 19 and 20, and the other from the terminal B of the ignition switch 14. The first photocoupler 19 includes an LED 19a and a phototransistor 19b and is connected between the secondary battery 16 and the first fixed contact point A of the relay 17. On the other hand, the second photocoupler 20 includes an LED 20a and a phototransistor 20b and is connected between the car battery 13 and the second fixed contact point B of the relay 17. Signal outputs of the photocouplers 19 and 20 is connected to the input of the OR gate 18. The telephone set 30 is connected at a signal receiving terminal SR to an antenna 31. In this circuitry arrangement, the OR gate 18 functions as a control unit, the photocouplers 19 and 20 as a current detecting circuit, and the relay 17 as a power supply selecting circuit.

In operation, the generator 12 is driven to provide an electric power to the car battery 13 which is thereby charged, when the engine 11 is rotated. As a matter of course, the ignition switch 14 has been turned on in this state, so that the relay coil 17a of the relay 17 has been energized by a signal from the output of the OR gate 18 to turn the relay contact 17b on the fixed contact point B of the relay 17. As a result, the power supply terminal PS of the telephone set 30 is connected to the car battery 13 the relay contact 17b and the second photocoupler 20, and is disconnected to the secondary battery 16, so that the telephone set 30 is supplied with an electric power from the car battery 13 and can be in operation for communication. At the same time, a current flows from the car battery 13 through the ignition switch 14 to the charger 15, by which the secondary battery 16 is charged to have a predetermined voltage.

On the other hand, when the ignition switch 14 is turned off, the relay coil 17a is not energized to turn the relay contact 17b off the fixed contact point B and on the first fixed contact point A of the relay 17, so that no current flows from the car battery 13 to the power supply terminal PS of the telephone set 30, but a current flows from the secondary battery 16 through the first photocoupler 19 and the relay contact 17b. Therefore, the telephone set 30 can operate in a waiting mode for a call. At this stage, the current which flows through the first photocoupler 19 is relatively small, so that a signal of the first photocoupler 19 which is supplied through the OR gate 18 to the relay coil 17a is small. As a result, the relay coil 17a is not energized, so that the relay contact 17b remains on the first fixed contact point A of the relay 17 to provide a connection between the telephone set 30 and the secondary battery 16.

When the telephone set 30 receives a call and goes into an occupied state, a relatively large load current flows from the secondary battery 16 through the first photocoupler 19 to the telephone set 30, so that a signal of the first photocoupler 19 becomes large to energize the relay coil 17a. As a result, the relay contact 17b turns on the second fixed contact point B to provide a connection between the telephone set 30 and the car battery 13. At this stage, a current does not flow through the first photocoupler 19, so that the first photocoupler 19 does not supply any signal to the OR gate 18. However, a relatively large current flows through the second photocoupler 20, so that the second photocoupler 20 supplies a selecting signal through the OR gate 18 to the relay coil 17a. As a result, the relay coil 17a is maintained to be energized to stay the relay contact 17b on the second fixed contact point B to provide a connection between the telephone set 30 and the car battery 13. When the telephone set 30 finishes conversation or communication, the current which flows through the second photocoupler 20 becomes small, so that the relay contact 17b turns on the first fixed contact point A of the relay 17 to connect the telephone set 30 to the secondary battery 16, so that the telephone set 30 is supplied with an electric power from the secondary battery 16 and goes back into a waiting state.

In the operation explained above, the secondary battery 16 is used only in case that the telephone set 30 is in a waiting mode, so that a consumption of an electric power of the secondary battery 16 is quite small. Consequently, a complete exhaustion of the secondary battery 16 can be prevented. The capacity of the secondary battery 16 is determined in accordance with the consumption of an electric power of the telephone set 30 which is in a waiting mode and a period for which the telephone set 30 should be maintained to be in a waiting mode. Therefore, the capacity thereof does not need to be large.

Figure 3:
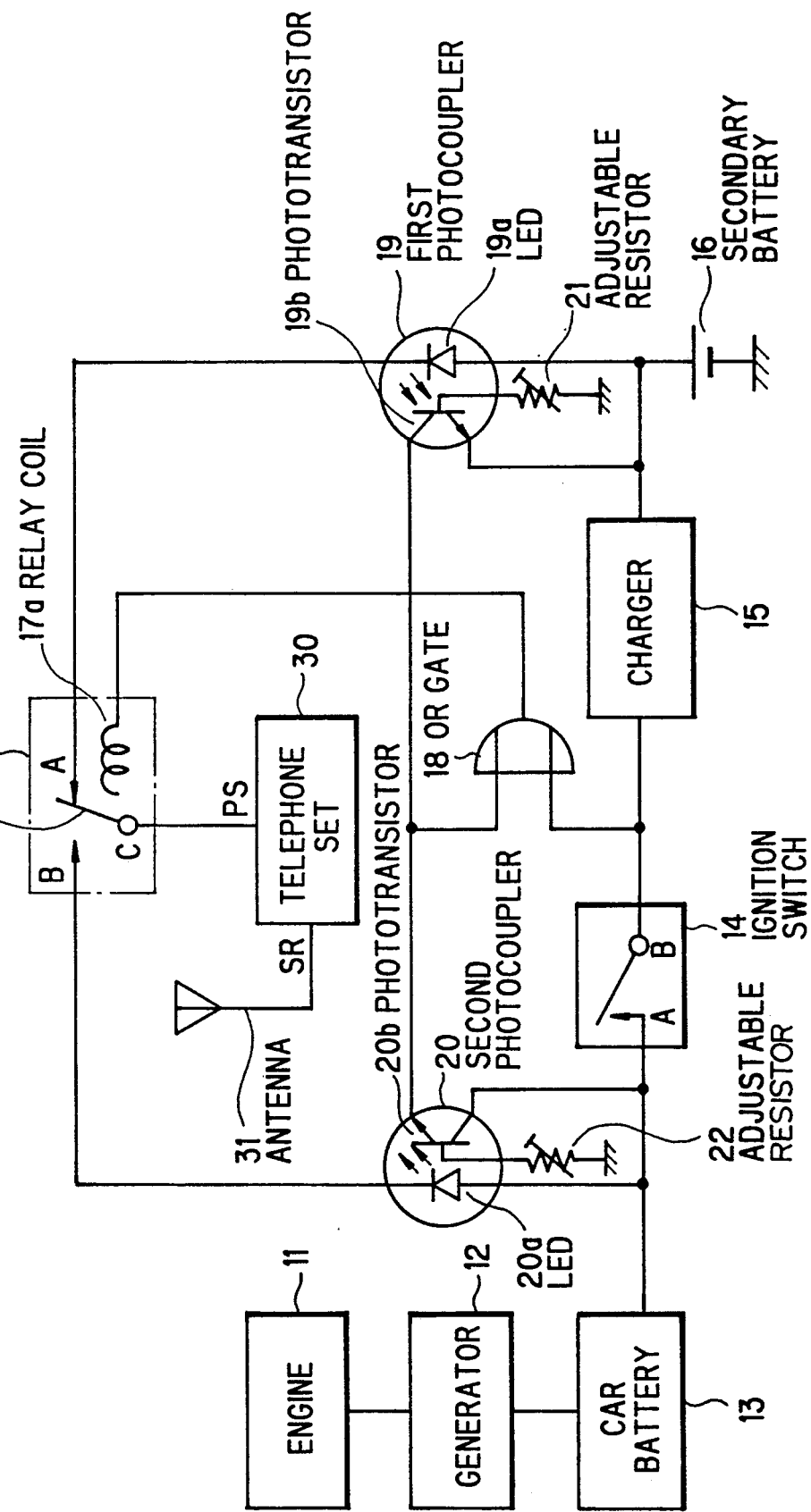

FIG. 3 shows an apparatus for controlling a power supply of an electric machine in a car in the second preferred embodiment, wherein like parts are indicated by like reference numerals as used in FIG. 2. In the second preferred embodiment, though a basic structure of the apparatus is the same as one explained in the first preferred embodiment, a current detecting circuit of the apparatus additionally includes adjustable (variable) resistors 21 and 22, which are connected to phototransistors 19b and 20b of first and second photocouplers 19 and 20, respectively. These adjustable resistors 21 and 22 are provided, in order to adjust the sensitivity of the photocouplers 19 and 20, so that a threshold level of currents, by which a relay 17 is activated, can be adjusted. The operation of the apparatus is the same as one explained in the first preferred embodiment, therefore the operation thereof is not explained here.

Figure 4:
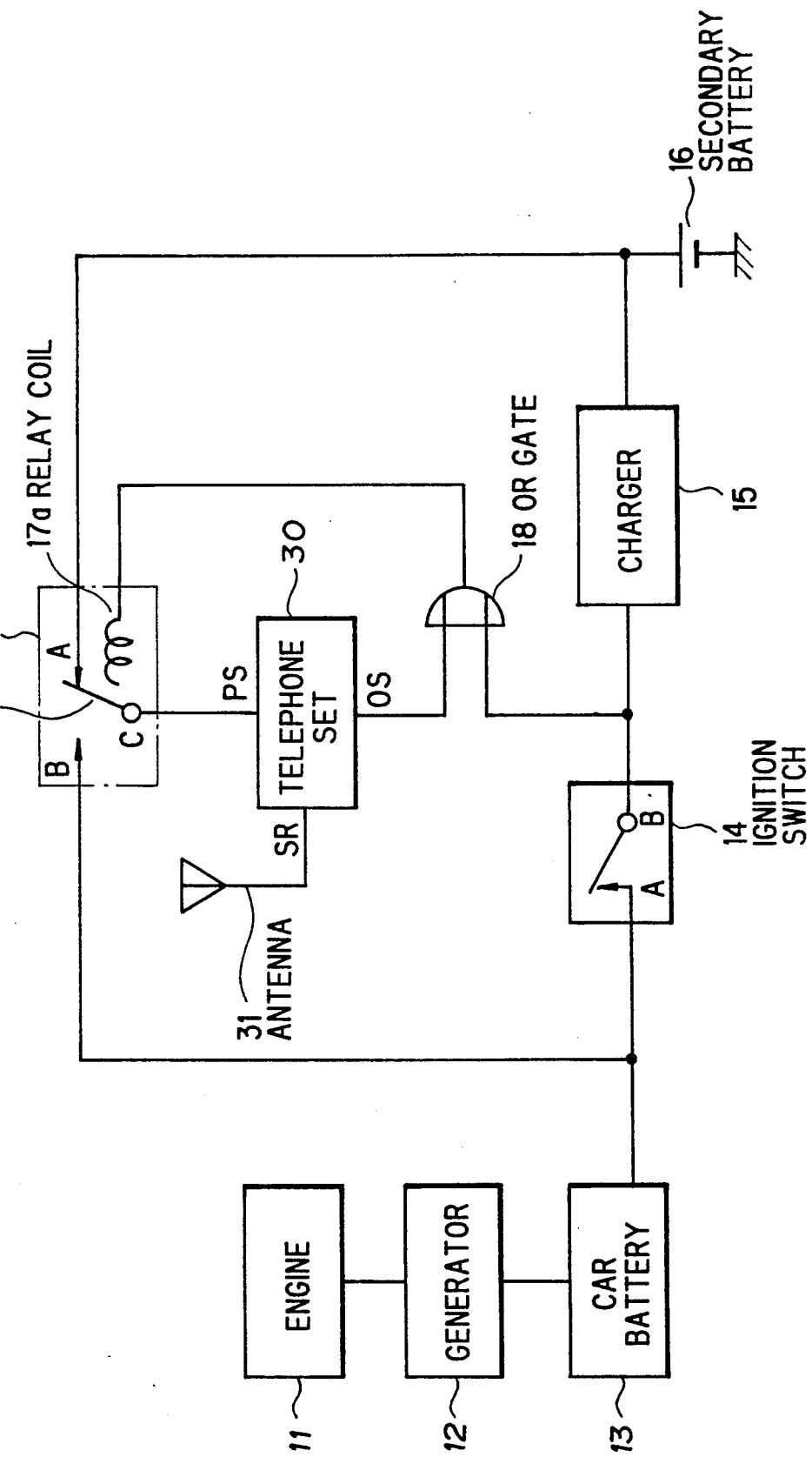

FIG. 4 shows an apparatus for controlling a power supply of an electric machine in a car in the third preferred embodiment, wherein like parts are indicated by like reference numerals as used in FIG. 2. In the third preferred embodiment, an OR gate 18 has two inputs from one terminal B of an ignition switch 14 and an operation signal output terminal OS, through which an operation signal is transmitted from a telephone set 30.

In operation, when the ignition switch 14 is turned on, a relay coil 17a is energized by a signal from an output of the OR gate 18 to turn a relay contact 17b on a fixed contact point B of the relay 17, so that the telephone set 30 is supplied with an electric power from a car battery 13 and can be in operation for communication.

When the ignition switch 14 is turned off, the relay coil 17a is not energized to turn the relay contact 17b off the fixed contact point B and on the first fixed contact point A, so that no current flows from the car battery 13 to the power supply terminal PS of the telephone set 30, but a small current flows from the secondary battery 16 through the relay contact 17b thereto. In this stage, the telephone set 30 is in a waiting state for a call. When the telephone set 30 receives a call, the telephone set 30 transmits an operation signal through the operation signal output terminal OS to the OR gate 18, so that the OR gate 18 supplies a signal to the relay coil 17a, which is energized to turn the relay contact 17b on the second fixed contact point B of the relay 17 to provide a connection between the telephone set 30 and the car battery 13. As a result, the telephone set 30 is supplied with an electric power from the car battery 13 during a communication. When the communication of the telephone set 30 ends, the telephone set 30 stops transmitting an operation signal to the OR gate 18, so that the relay coil 17a is not energized, and the relay contact 17b moves on to the first fixed contact point A of the relay 17. As a result, the telephone set 30 is supplied with an electric power from the secondary battery 16.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for controlling a power supply to an electric machine in a vehicle, comprising:
   a primary power supply for supplying an electric power to said electric machine, said primary power supply being a battery which is charged from a generator driven by an engine of said vehicle;
   a secondary power supply for supplying an electric power to said electric machine, said secondary power supply being an additional battery which is charged from said primary power supply;
   means for detecting a load current of said electric machine;
   means for selecting power for powering the electric machine from one of said primary and secondary power supplies; and
   means when the vehicle engine is off for controlling said selecting means to select said primary power supply when said load current is over a predetermined value and to select said secondary power supply when said load current is below said predetermined value.

2. An apparatus for controlling a power supply to an electric machine in a vehicle, according to claim 1, wherein:
   said detecting means, comprises;
   first and second means for detecting load currents supplied from said primary and secondary power supplies, respectively, to said electric machine.

3. An apparatus for controlling a power supply to an electric machine in a vehicle, according to claim 2, wherein:
   said first and second detecting means are photocoulers each including an LED and a phototransistor.

4. An apparatus for controlling a power supply to an electric machine in a vehicle, according to claim 1, wherein:
   said selecting means is a relay including a coil for energization by said controlling means and first and second relay contacts, respectively, selected by energization and non-energization of said coil.

5. An apparatus for controlling a power supply to an electric machine in a vehicle, according to claim 1, wherein:
   said controlling means is an OR gate supplying said selecting means with a selecting signal dependent on a level of said load current.

6. An apparatus for controlling a power supply to an electric machine in a vehicle, according to claim 3, further comprising:
   variable resistors connected to the bases of said photocouplers, respectively, for adjusting a threshold level to select said one power supply.

7. An apparatus for controlling a power supply to an electric machine in a vehicle, comprising:
   a primary power supply for supplying an electric power to said electric machine, said primary power supply being a battery which is charged from a generator driven by an engine of said vehicle;
   a secondary power supply for supplying an electric power to said electric machine, said secondary power supply being an additional battery which is charged from said primary power supply;
   means for detecting operational modes of said electric machine;
   means for selecting power for powering the electric machine from one of said primary and secondary power supplies; and
   means when the vehicle engine is off for controlling said selecting means to select said primary power supply when said electric machine is in an operating mode and to select said secondary power supply when said electric machine is in a waiting mode.

8. An apparatus for controlling a power supply to an electric machine in a vehicle, according to claim 7, wherein:
   said selecting means is a relay activated by a selecting signal supplied from said controlling means dependent on said mode of said electric machine, and said controlling means is an OR gate having input terminals connected, respectively, to said electric machine and an ignition switch of said vehicle to supply said relay with said selecting signal.

9. An apparatus for controlling a power supply to an electric machine ina vehicle, comprising:
   a primary power supply for supplying an electric power to said electric machine, said primary power supply being a battery which is charged from a generator driven by an engine of said vehicle;
   a secondary power supply for supplying an electric power to said electric machine, said secondary power supply being an additional battery which is charged from said primary power supply;
   means for detecting an on or off state of an engine in said vehicle;
   means for detecting a load current of said electric machine;
   means for selecting power for powering the electric machine from one of said primary and secondary power supplies; and
   means for controlling said selecting means to select said primary power supply when said engine is in said on state or when said engine is in an off state and said load current is over a predetermined value, and to select said secondary power supply when said engine is in said off state and said load current is below said predetermined value.

10. An apparatus for controlling a power supply to an electric machine in a vehicle, comprising:
    primary power supply means for supplying power to electric equipment;
    secondary power supply means for supplying power to said equipment;
    means for detecting a waiting or operating condition of said equipment to provide a condition signal; and
    means responsive to said condition signal for selectively supplying power from one of said primary and secondary power supply means to said equipment.

11. An apparatus for controlling a power supply to an electric machine in a vehicle, according to claim 10:
    wherein said primary power supply means comprises a car battery, and
    wherein said secondary power supply means is charged with said car battery.

12. An apparatus for controlling a power supply to an electric machine in a vehicle, according to claim 10, wherein:
    said detecting means comprises means for detecting the load current of said equipment to produce said condition signal.

* * * * *

UNITED STATES PATENT AND TRADEMARK OFFICE
CERTIFICATE OF CORRECTION

PATENT NO. : 5,149,985

DATED : September 22, 1992

INVENTOR(S) : Ryuhei FUJIWARA

It is certified that error appears in the above-identified patent and that said Letters Patent is hereby corrected as shown below:

Col. 5, line 23, delete "when the vehicle engine is off".

Col. 5, line 24 after "means", insert --when the vehicle engine is off--.

Signed and Sealed this

First Day of February, 1994

Attest:

BRUCE LEHMAN

*Attesting Officer*   Commissioner of Patents and Trademarks